United States Patent
Pappa et al.

(10) Patent No.: US 6,468,434 B2
(45) Date of Patent: Oct. 22, 2002

(54) PHOTODEGRADATIVE PROCESS FOR THE PURIFICATION OF CONTAMINATED WATER

(75) Inventors: Rosario Pappa, Monterotondo; Felicia Massetti, Castelnuovo di Porto; Umberto Cova, Via Fonte Meravigliosa, all of (IT)

(73) Assignee: EniTecnologie S.p.A., San Donato Milanese (IT)

( * ) Notice: Subject to any disclaimer, the term of this patent is extended or adjusted under 35 U.S.C. 154(b) by 0 days.

(21) Appl. No.: 09/876,108

(22) Filed: Jun. 8, 2001

(65) Prior Publication Data

US 2002/0030021 A1 Mar. 14, 2002

(30) Foreign Application Priority Data

Jun. 22, 2000 (IT) .......................................... MI20A1405

(51) Int. Cl.$^7$ ................................................... C02F 1/30
(52) U.S. Cl. ........................ 210/748; 210/747; 210/760; 210/908
(58) Field of Search ................................ 210/747, 748, 210/760, 908

(56) References Cited

U.S. PATENT DOCUMENTS 5,118,422 A    6/1992   Cooper et al.
6,197,206 B1 *  3/2001   Wasinger

FOREIGN PATENT DOCUMENTS

| BE | 1 008 429   | 5/1996  |
|----|-------------|---------|
| EP | 0 819 649   | 1/1998  |
| EP | 0 882 674   | 12/1998 |
| EP | 1 041 042   | 10/2000 |
| WO | WO 95 21794 | 8/1995  |

* cited by examiner

*Primary Examiner*—Betsey Morrison Hoey
(74) *Attorney, Agent, or Firm*—Oblon, Spivak, McClelland, Maier & Nuestadt, P.C.

(57) ABSTRACT

A photodegradative process is described for the purification of water contaminated by ether-based compounds, especially methylterbutyl ether (MTBE) or its analogous products, which comprises the following steps:

(a) treatment of the contaminated water with an inorganic acid up to a pH ranging from 4.0 to 4.5 with the elimination of the carbon dioxide thus formed;

(b) dispersion in the water of solid particles of a metal oxide of the semiconductor type or dissolution of a stream consisting of ozone in pure oxygen or air;

(c) irradiation of the dispersion or solution obtained in step (b) with ultraviolet light to degrade the ether-based contaminants.

15 Claims, 1 Drawing Sheet

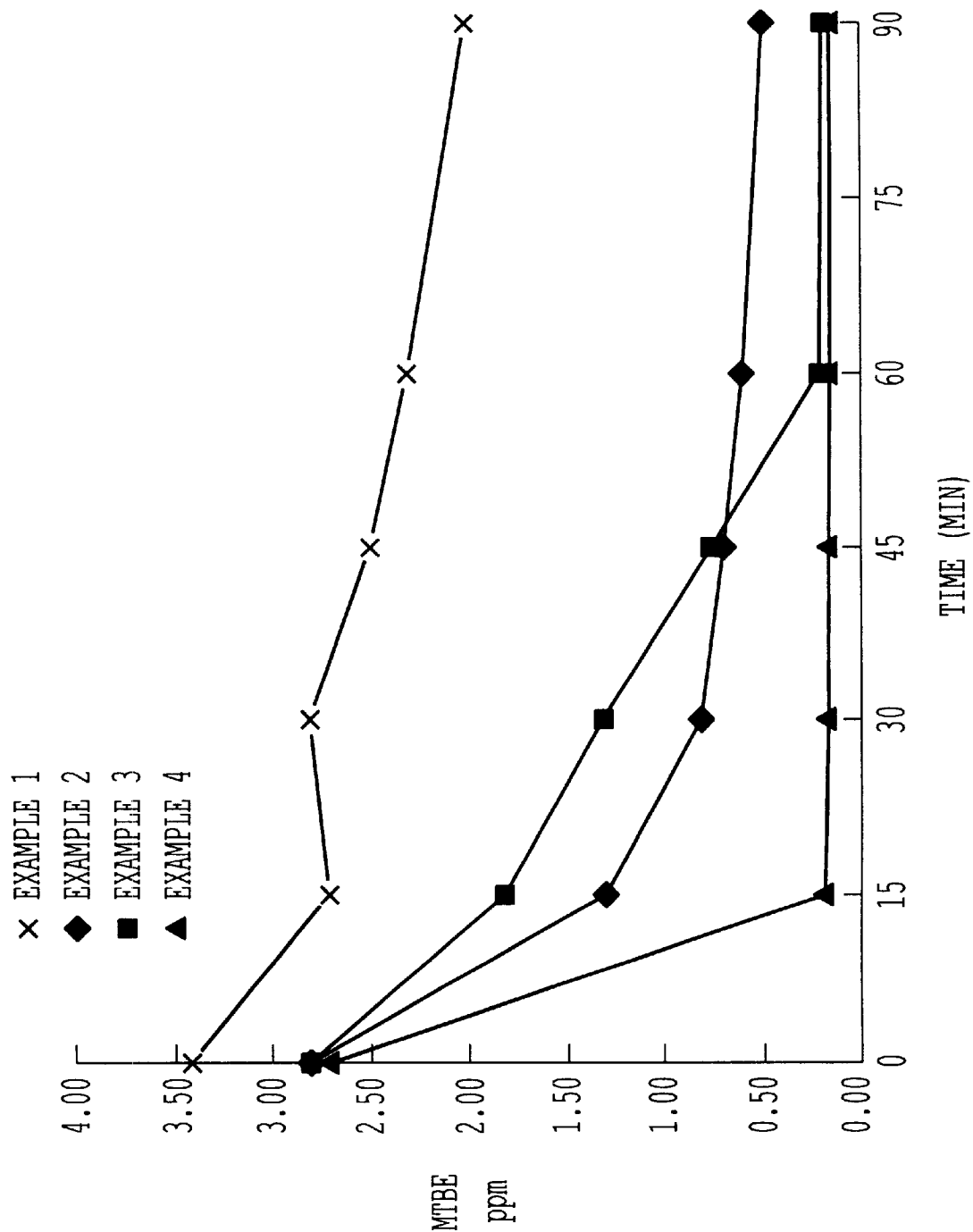

PHOTODEGRADATIVE PROCESS FOR THE PURIFICATION OF CONTAMINATED WATER

FIELD OF THE INVENTION

The present invention relates in general to a photodegradative process for the purification of water contaminated by ether-based compounds.

More specifically, the present invention relates to a photodegradative process for the purification of water contaminated by methylterbutyl ether (MTBE) or its analogous products such as ethylterbutyl ether (ETBE).

BACKGROUND OF THE INVENTION

Soft groundwater is becoming an insufficient resource throughout the world. One of the main reasons for its scarcity is the inflow of chemical products and biological agents into groundwater with a harmful effect on the quality of the water.

The main factors which are a cause of preoccupation are chemical compounds such as salts of heavy metals and organic substances.

These materials, generally defined as "contaminants" or "pollutants", may remain in the groundwater even after passage through natural filters as calcareous zones.

Ether-based compounds such as methylterbutyl ether (MTBE) and ethylterbutyl ether (ETBE), are commonly used as high-octane additives in fuels for motor vehicles to improve their combustion and significantly reduce the quantity of carbon monoxide and other pollutants present in the motor exhausts.

These ethers are generally substances which are not easily degradable and remain in deep water and sediments in which they have been accidentally dispersed.

The toxicity of these compounds is still very questionable. For example, according to a recent Italian report (Trenton Times, Nov. 13, 1994), MTBE is classified as a potential carcinogen for human beings, whereas other studies demonstrate the limited toxicity of this product.

Regardless of its toxicity, however, MTBE gives water a very strong, unpleasant smell which can be perceived at concentrations starting from about 20 ppb.

Furthermore, MTBE is relatively soluble in water (43,000 ppm) and therefore has a high mobility in soil allowing it to rapidly migrate in underground water.

DESCRIPTION OF THE PRIOR ART

The treatment normally used for removing contaminants from water involves techniques such as adsorption on activated carbon, stripping with air, disinfecting/sterilization by means of chlorination or ozonization.

Adsorption on activated carbon, however, has the disadvantage of generating, in turn, an additional waste product consisting of the carbon itself impregnated with a badly-smelling material which must therefore be appropriately incinerated, as well as typical drawbacks associated with the treatment of liquid streams on activated carbon beds.

Stripping with air is difficult to apply as the gaseous stream, if discharged into the atmosphere, causes obvious problems, making it necessary to collect the gaseous stream and treat it further to block the polluting agent.

In addition, a recent study on 15 polluted sites demonstrated that the efficiency of removal by stripping was about 56% (American Petroleum Institute, Pub. Nr. 4531, 1991).

Treatment with chemical oxidizing agents, such as for example hypochlorite, on the one hand eliminates the characteristic smell of the water, but does not remove the presence of polluting compounds due to the partial oxidation of the contaminating agent.

A technique which is being used more and more frequently for purifying water contaminated by organic compounds consists in the photodegradation of the contaminants by the action of solar or UV radiation, operating in the presence of metal oxide catalysts of the semiconductor type.

This technique, which is generally carried out in the presence of oxygen and at room temperature, causes the "mineralization" of the contaminants, this term referring to the complete degradation of the pollutant, with the formation of simple substances such as water, carbon dioxide and, possibly, mineral acids.

Semiconductor metal oxides, such as titanium dioxide, are materials which have a particular electronic configuration; the valence band, at a lower energy level, is completely occupied by electrons, whereas the conduction band, at a higher energy level, is almost completely empty. When a semiconductor of this kind is irradiated with energy photons higher than the "bandgap" (i.e. the interval between the two bands), or with light having a wave-length lower than the "bandgap", the electrons pass from the valence band to the conduction band, leaving an electronic deficiency in the valence band and consequently causing the formation of electron-hole couples.

The electrons are transferred to the semiconductor/liquid interface and the interactions between electrons and/or photogenerated holes, the species adsorbed on the surface of the semiconductor and the oxygen present in the system cause the degradation of the contaminants.

From a technical-environmental point of view, photocatalysis has the following advantages, with respect to the more traditional technologies:

complete mineralization of a wide range of organic contaminants;

high separation efficiency to residual concentrations of the organic contaminant in the order of ppb;

absence of regenerative processes of the thermal type, required for example when activated carbon is used, which often cause problems of an environmental nature linked to gas emissions, and absence of microbial fouling phenomena typical of carbon filters.

In practice, however, there are various difficulties which prevent a wide application of photodegradation for the purification of water.

For example, water coming from the underground or from surface streams, contains varying quantities of alkaline and earth-alkaline metal salts which can interact with the catalyst suspended in the purification system, with consequent deactivation of the catalyst itself.

In particular, this phenomenon is attributed to the interaction which is established between the catalytically active sites of the semiconductor metal oxide and anions having coordinating characteristics, present in the water subjected to treatment.

It has been particularly observed that the $HCO_3^-$ bicarbonate ion, commonly present in water associated with the $Ca^{++}$ ion, significantly inhibits the catalytic activity of said semiconductor oxides.

SUMMARY OF THE INVENTION

It has now been found, according to the present invention, that the bicarbonate ion can be simply and economically eliminated to obtain water without contaminants by means of pretreatment of the water with an inorganic acid up to a pH ranging from 4.0 to 4.5.

In addition, it has been observed that this acidification pretreatment accelerates the photodegradation kinetics of the pollutant also using the UV oxidative/ozone system alone, making the use of semiconductor metal oxide catalysts no longer indispensable and considerably simplifying the setting up of a water treatment plant.

In accordance with this, the present invention relates to a photodegradative process for the purification of water contaminated by ether-based compounds, characterized by the following steps:

(a) pretreatment of the contaminated water with an inorganic acid up to a pH ranging from 4.0 to 4.5 with the elimination of the carbon dioxide thus formed;

(b) dispersion in the water of solid particles of a semiconductor metal oxide or dissolution of a stream consisting of ozone in pure oxygen or air;

(c) irradiation of the dispersion or solution obtained in step (b) with ultraviolet light to degrade the ether-based contaminants.

The water which can be treated according to the process of the present invention comes from the underground or from surface streams which contains organic pollutants such as methylterbutyl ether or its analogous products (ETBE) or other compounds such as, for example, cycloaliphatic compounds, for example tetrahydrofuran, used as solvents, ter amyl ether (TAME, tertiary-amyl ether) and diiospropyl ether (DIPE) which are used as additives for fuels.

The overall quantity of these contaminants can reach concentrations in the order of tens of parts per million by weight (ppm). Furthermore, the water contains the bicarbonate ion whose concentration may vary, depending on the origin, from about 50 to about 500 mg/l.

According to the present invention, said water is subjected to pretreatment suitable for eliminating the bicarbonate ion, enabling the subsequent photodegradation of the organic contaminants without problems of interference with the oxidizing system consisting of UV light and ozone or deactivation of the catalyst.

The reduction in the concentration of pollutants which can be reached with this process allows water to be obtained with specifications equal to or sometimes better than those imposed by Italian law for discharge into surface water. A simple correction treatment of the pH, using known methods, such as passage of the water on a bed made of calcareous material, is required at the outlet of the treatment to maintain the pH specifications.

DETAILED DESCRIPTION OF THE INVENTION

More specifically, the present invention relates to a photodegradative process for the purification of water contaminated by methylterbutyl ether (MTBE, methyl tertiary-butyl ether) or its analogous products such as ethylterbutyl ether (ETBE, ethy tertiary-butyl ether).

In step (a) of the process of the present invention, the contaminated water is treated with an inorganic acid, preferably 2 N aqueous sulfuric acid, up to a pH ranging from 4.0 to 4.5. In this case the quantity of acid added to the water is lower than the 1000 ppm limit imposed by the laws in force for discharge into surface water.

After acidification, the carbon dioxide is eliminated. This operation, which can be effected, for example, by atomizing water using a spray gun, allows the removal of the dissolved carbon dioxide, thus favouring the complete elimination of the $HCO_3^-$ ion by mass action on the equilibrium:

$$HCO_3^- + H^+ \rightarrow CO_2 + H_2O$$

In step (b) of the process, a metal oxide of the semiconductor type, in the form of solid particles, is dispersed in the water coming from step (a) above.

Catalysts suitable for the purpose are titanium dioxide ($TiO_2$), ZnO, $SnO_2$, $Fe_2O_3$ and $Fe_3O_4$.

Among these, titanium dioxide is preferred, and in particular titanium dioxide in anatase crystalline form, for reasons of photocatalytic activity and for its stability under the operating conditions.

The catalyst is conveniently in the form of particles having a size in the order of 0.5–3 $\mu$m, in order to obtain a good dispersion of the catalyst in the aqueous phase.

The concentration of the catalyst in the relative dispersion generally varies from 20 to 1,000 ppm and is preferably in the order of 50 ppm.

According to a further embodiment of the process of the present invention, in step (b) the acidified water can be saturated with a stream consisting of ozone in pure oxygen or air at a concentration ranging from 10 to 70 $g/m^3$, preferably 50 $g/m^3$.

In step (c) of the process, the dispersion or solution coming from step (b) is subjected to irradiation with ultraviolet light until degradation of the organic contaminants contained therein.

Radiation capable of activating the photo-oxidation of the pollutant as a result of the dispersed semiconductor catalyst, especially titanium dioxide, or ozone dissolved in water, is ultraviolet radiation (150–420 nm), especially that of close ultraviolet (300–400 nm).

The radiation sources normally used are therefore mercury arc lamps (at high, medium or low pressure), or xenon lamps which emit within the UV range. These devices are available on the market.

The photodegradation reaction is carried out in an elongated cylindrical reactor, in which a tubular UV lamp is inserted along the main axis of the reactor, in order to obtain the maximum quantic yield. According to an embodiment, the suspension is continuously circulated between the photochemical reactor and a container of the suspension.

The photodegradation reaction is carried out at room temperature, supplying oxygen or air to the photodegradation environment in relation to the oxygen requirements of the system undergoing decontamination.

When operating under the conditions described above, the times for the complete degradation of the organic pollutants are in the order of 10–15 minutes.

The following examples, whose sole purpose is to describe the present invention in greater detail, should in no way be considered as limiting the scope of the invention itself.

In particular, example 1, provided for comparative purposes, describes the trend of the decomposition reaction on a non-pretreated water sample, using a photodegradative system consisting of UV and titanium dioxide.

In example 2, the same non-pretreated water is used, adopting a photodegradative system consisting of UV and ozone.

Examples 3 and 4, which illustrate the invention, demonstrate that pretreatment of the water allows excellent results to be obtained with respect to the comparative techniques.

EXAMPLE 1

Comparative 100 ppm of $TiO_2$ are added to a sample of groundwater containing 3.5 ppm of MTBE and characterized by a carbonate hardness of 21.6 French Degrees ($HCO_3^-$ ion content 132 ppm) and a pH of 7.5.

The dispersion is continuously circulated, with a flow-rate of 100 l/h, inside a cylindrical photochemical reactor (diameter 8 cm; height 1.5 m) in which a tubular UV lamp with a power of 80 Watts, has been inserted, which emits radiation within the range of 220–420 nm. The system is pressurized with pure oxygen at a pressure of 100 milliBars.

During the test, the temperature is maintained at about 22° C. and the decomposition of MTBE takes place until mineralization, i.e. the formation of carbon dioxide and water.

The decomposition trend is followed by the removal of samples, at regular intervals, which are analyzed by means of gaschromatography using the head space technique.

The results are provided in the graph of FIG. 1, where the concentration of MTBE is indicated in the ordinate and the time in minutes in the abscissa.

It can be observed that after 90 minutes, the residual concentration of MTBE pollutant is 2.75 ppm, with a reduction, with respect to the initial value, of about 38%.

EXAMPLE 2

Comparative

The reaction is carried out as described in example 1, but pressurizing the system at 100 milliBars with pure oxygen containing 66 $g/m^3$ of ozone produced by a specific commercial generator.

The decrease in the concentration of pollutant in the water is more rapid with respect to example 1 and after 30 minutes the residual concentration of MTBE in the water is reduced to 0.80 ppm (about 77%).

Even though the radiation is prolonged for a further 60 minutes, there is no significant additional reduction in the pollutant which, after a total of 90 minutes of treatment, is 0.5 ppm (about 86%).

EXAMPLE 3

The same water sample used in the previous examples is treated with sulfuric acid 2 N until a pH of 4.3 is reached, obtaining a final concentration of sulfate ion equal to about 300 ppm.

$TiO_2$ (100 ppm) is then added to the water and the dispersion is circulated in the photo-reactor pressurized to 100 milliBars with pure oxygen.

As can be seen in the graph of FIG. 1, the photodegradation rate is more rapid with respect to the comparative test of example 1, in which there was no pretreatment of the water.

The concentration of MTBE after 60 minutes of irradiation is reduced to 0.2 ppm (94%).

EXAMPLE 4

The same water sample used in the previous examples is treated with sulfuric acid 2 N until a pH of 4.3 is reached, obtaining a final concentration of sulfate ion equal to about 300 ppm.

The water is then circulated in the photo-reactor pressurized to 100 milliBars with oxygen containing 66 $g/m^3$ of ozone.

The photodegradation rate is more rapid than what is observed in the comparative test of example 2.

The concentration of MTBE after 15 minutes of irradiation is reduced to 0.18 ppm (95%).

The result is comparable to what is obtained in example 3, with the difference that the catalyst is not used to promote the photo-oxidation of the pollutant, thus eliminating the necessity of having to filter the treated water to separate the dispersed solid and simplifying the treatment process.

What is claimed is:

1. A photodegradative process for the purification of water contaminated by one or more ether-based compounds and containing bicarbonate ion characterized by the following steps:

(a) treatment of the contaminated water with an inorganic acid up to an acidification of pH 4.0 to form carbon dioxide from the bicarbonate ion with elimination of the carbon dioxide thus formed;

(b) dispersion in the water of solid particles of a semiconductor metal oxide or dissolution in the water of a stream consisting of ozone in pure oxygen or air;

(c) irradiation of the dispersion or solution obtained in step (b) with ultraviolet light to degrade the ether-based contaminants.

2. The process according to claim 1, wherein the water subjected to treatment comes from underground or from surface streams which contain ether-based compounds and bicarbonate ion in a concentration of over 50 mg/l.

3. The process according to claim 1, wherein the ether-based contaminants are at least one selected from the group consisting of methyl tert-butyl ether, ethyl tert-butyl ether, tert-amyl ether, diisopropyl ether, cycloaliphatic compounds and tetrahydrofuran.

4. The process according to claim 1, wherein in step (a) the inorganic acid is sulfuric acid.

5. The process according to claim 4, wherein the sulfuric acid is in a 2 N aqueous solution.

6. The process according to claim 1, wherein in step (b) the semiconductor metal oxide is selected from the group consisting of $TiO_2$, $ZnO$, $SnO_2$, $Fe_2O_3$ and $Fe_3O_4$.

7. The process according to claim 6, wherein in step (b) the semiconductor metal oxide is selected from $TiO_2$ in the anatase crystalline form.

8. The process according to claim 6, wherein the metal oxide is in the form of particles having a size in the order of 0.5–3 $\mu m$.

9. The process according to claim 1, wherein in step (b) the semiconductor metal oxide is dispersed in the water to be decontaminated at a concentration ranging from 20 to 1000 ppm.

10. The process according to claim 9, wherein in step (b) the semiconductor metal oxide is dispersed in the water at a concentration in the order of 50 ppm.

11. The process according to claim 1, wherein in step (b) the concentration of ozone in the oxygen or air ranges from 10 to 70 $g/m^3$.

12. The process according to claim 11, wherein the concentration of ozone is 50 $g/m^3$.

13. The process according to claim 12, wherein in step (c) the ultraviolet light is 300–400 nm ultraviolet light.

14. The process according to claim 1, wherein in step (c) the ultraviolet light is 150–420 nm ultraviolet light.

15. The process according to claim 1, wherein in step (c) the radiation source for the ultraviolet light is a high, medium or low pressure mercury arc lamp, or xenon lamp.

* * * * *

UNITED STATES PATENT AND TRADEMARK OFFICE
CERTIFICATE OF CORRECTION

PATENT NO. : 6,468,434 B2
DATED : October 22, 2002
INVENTOR(S) : Pappa et al.

It is certified that error appears in the above-identified patent and that said Letters Patent is hereby corrected as shown below:

Title page,
Item [30], the Foreign Application Priority Data should read:
--     [30]     Foreign Application Priority Data
        Jun. 22, 2000 (IT) ............................. MI2000A 001405 --

Signed and Sealed this

Eighteenth Day of February, 2003

JAMES E. ROGAN
*Director of the United States Patent and Trademark Office*